United States Patent

[11] 3,539,191

[72] Inventor Kozo Yamamoto
Hirakata-Shi, Japan

[21] Appl. No. 669,141
[22] Filed Sept. 20, 1967
[45] Patented Nov. 10, 1970
[73] Assignee Matsushita Electric Industrial Co. Ltd., Kadome-shi, Osaka, Japan, a corporation of Japan
[32] Priority Oct. 18, 1966, Feb. 3, 1967, April 19, 1967
[33] Japan
[31] 41/97,165, 42/9,652 and 42/33,604

[54] MAGNETIC RECORDING AND REPRODUCING APPARATUS OF MOVABLE HEAD TYPE WITH AZIMUTH ADJUSTMENT MEANS
2 Claims, 9 Drawing Figs.

[52] U.S. Cl. .......... 274/4, 179/100.2
[51] Int. Cl. .......... G11b 21/08 G11b 21/12
[50] Field of Search .......... 179/100.2CA, 100.2MI, 100.2Z; 274/11A, 4A

[56] References Cited

UNITED STATES PATENTS

| | | | |
|---|---|---|---|
| 3,429,578 | 2/1969 | Furuichi | 179/100.2 |
| 3,445,116 | 5/1969 | Knox | 179/100.2 |
| 2,468,198 | 4/1949 | Heller | 179/100.2 |
| 3,370,131 | 2/1968 | Reed | 179/100.2 |
| 3,388,911 | 6/1968 | Wilson et al. | 179/100.2 |

*Primary Examiner*—Bernard Konick
*Assistant Examiner*—Robert S. Tubper
*Attorney*—Stevens, Davis, Miller and Mosher

ABSTRACT: A magnetic recording and reproducing apparatus having a transducing head stepwise movable in a direction perpendicular to the traveling direction of a magnetic tape and having a head supporting arm provided with means for tilting the head core face in a predetermined direction relative to the tape magnetic surface. A mechanism for causing equiangular rotation of a cam is combined with the above means so as to move the head to the desired accurate position, to prevent crosstalk and level fluctuation, and to improve the head moving mechanism thereby reducing current consumption and prolonging the working time.

INVENTOR
KOZO YAMAMOTO

BY Stevens, Davis, Miller & Mosher

ATTORNEYS

INVENTOR
KOZO YAMAMOTO

BY Stevens, Davis, Miller & Mosher
ATTORNEYS

INVENTOR

KOZO YAMAMOTO

BY Stevens, Davis, Miller & Mosher

ATTORNEYS

INVENTOR
KOZO YAMAMOTO

BY Stevens, Davis, Miller & Mosher

ATTORNEYS

INVENTOR
KOZO YAMAMOTO

BY Stevens, Davis, Miller & Mosher

ATTORNEYS

MAGNETIC RECORDING AND REPRODUCING APPARATUS OF MOVABLE HEAD TYPE WITH AZIMUTH ADJUSTMENT MEANS

BACKGROUND OF THE INVENTION

1. Field of the Invention

This invention relates to a magnetic recording and reproducing apparatus, and more particularly to a magnetic recording and reproducing apparatus of the type for use with a tape cartridge in which a transducing head is adapted to produce a vertical swinging movement by means of a cam relative to a multitrack recording medium mounted in the cartridge so that the tracks engaged by the transducing head can be successively changed over for long-time recording and reproducing.

2. Description of the Prior Art

Magnetic recording and reproducing apparatus of the movable head type for use with a tape cartridge are known in the art. The known magnetic recording and reproducing apparatus of the type described has a basic structure comprising a mechanism for causing a vertical swinging movement of a head arm with a transducing head mounted thereon in a direction perpendicular with respect to the traveling direction of a tape by means of a cam of a discal or like shape, a mechanism for causing intermittent rotation of the cam in one direction through a predetermined angle at a time, and a track change-over control mechanism for effecting the desired change over of the tracks on the tape. These mechanisms must always operate under a highly stable state with high precision.

More precisely, the mechanism for causing the vertical swinging movement of the head arm in the prior apparatus generally employs a hinge structure in which the head arm is swingably supported by a pin passed through a bore in the head arm. In view of the prior structure as described above, the playing movement of the head arm in its vertical as well as transverse direction due to the clearance in the hinge portion has been inevitable and such playing movement has frequently given rise to crosstalk and level fluctuation. Further, the above structure has been susceptible to wear at the hinge portion which results in lowered performance of the apparatus.

The tape travels past the transducing head by being limited in its vertical movement by means of a tape limiter. Since in this case the tolerance in the tape having a width of 6.25 mm. is ±0.05 mm., the minimum dimension of the width of the tape receiving slot in the tape limiter must be 6.30 mm., and thus a slot width of 6.30 ±0.05 mm. is required when the tolerance for the machining is taken into consideration. Because of the above fact, a maximum vertical clearance of 0.15 mm. exists between the tape and the tape receiving slot in the tape limiter and thus the tape having passed through the tape limiter travels past the transducing head while making a vertical movement of 0.15 mm. relative to the transducing head. The above movement of the tape provides a serious problem in respect of the occurrence of crosstalk and level fluctuation especially in the apparatus employing a tape 6.25 mm. wide having thereon eight tracks.

In the prior apparatus, the cam for directly causing the vertical swinging movement of the transducing head must always make an equiangular rotating movement. The mechanism previously employed for the above purpose comprised a ratchet mounted on the cam in integral relation therewith and a pawl for causing intermittent rotation of the ratchet, hence the cam by its reciprocating movement. Since, with such a structure, any variation in the load on the cam or in the moving speed of the pawl tends to cause overrun of the ratchet, hence the cam beyond the predetermined stopping position and thus gives rise to crosstalk and level fluctuation. In order to avoid such a problem, an overrun stopper is provided in some of the existing sets. However, the provision of such overrun stopper has not exhibited a satisfactory effect because the stopper is not constructed integrally with the cam driving pawl and it is difficult to attain registration in their mounted positions.

SUMMARY OF THE INVENTION

It is therefore the primary object of the present invention to provide a multitrack recording and reproducing apparatus of the movable head type which is free from the prior defects, as described above, and which shows an improved performance.

Another object of the present invention is to provide an apparatus of the type described in which the pivotal axis of a head arm with a transducing head mounted thereon is free from any playing movement in a vertical as well as transverse direction.

A further object of the present invention is to provide an apparatus of the type described in which a magnetic tape can travel past the transducing head without any vertical movement thereof.

Still another object of the present invention is to provide an apparatus of the type described in which a cam for causing a vertical swinging movement of the transducing head can produce a stable and predetermined angular rotation.

DESCRIPTION OF THE PREFERRED EMBODIMENT

The present invention illustrated in FIGS. 1 to 9 provides effective means for eliminating the possibility of crosstalk, level fluctuation, reducing current consumption and protecting the solenoid against possible burn in the multitrack recording and reproducing apparatus of the movable head type described above.

Figure 1:
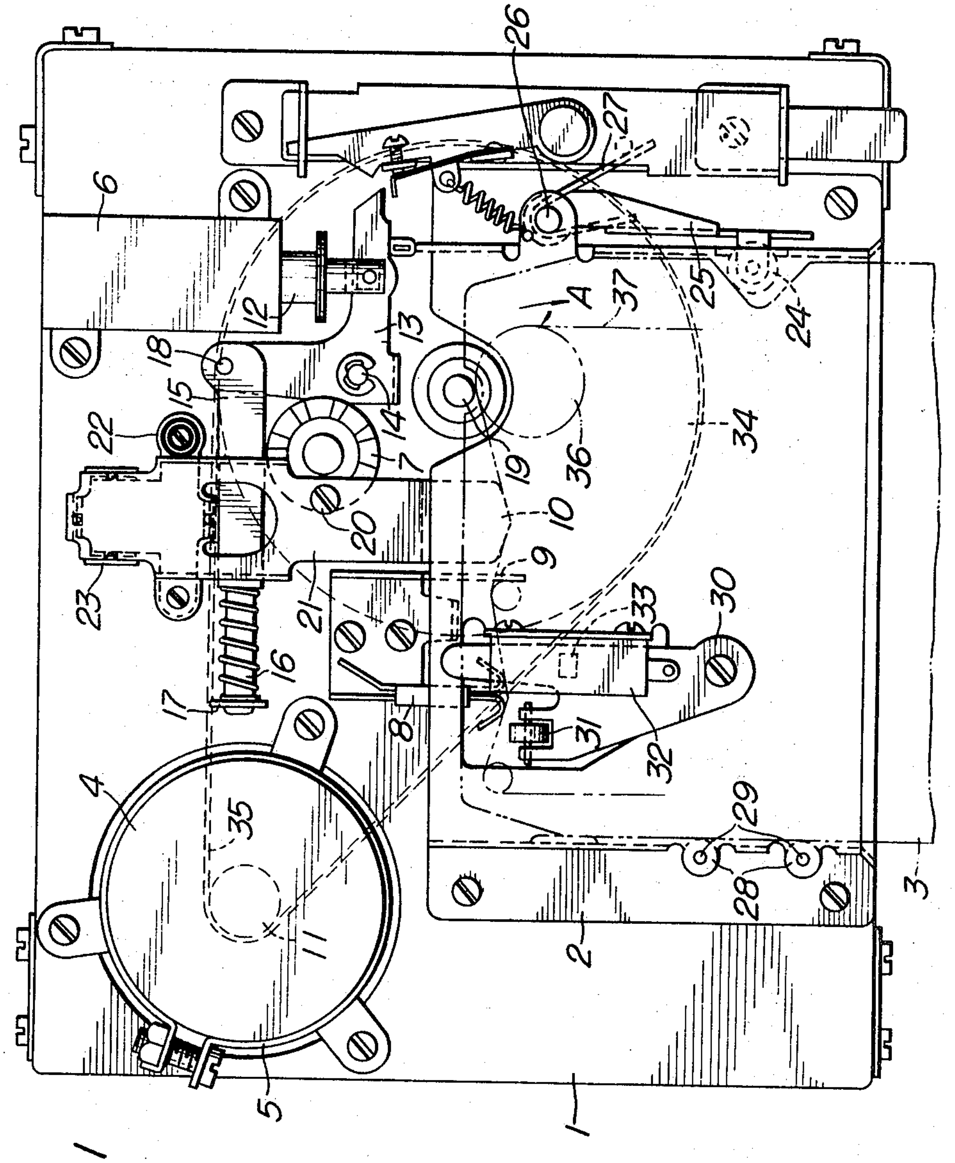
FIG. 1 is a plan view of the magnetic recording and reproducing apparatus of the movable head type embodying the present invention.
Figure 2:
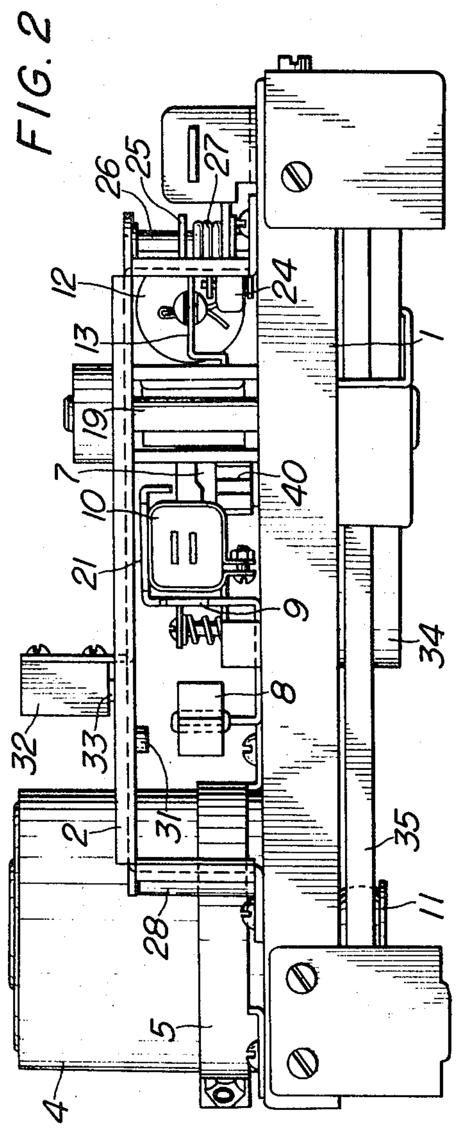
FIG. 2 is a front elevational view of the apparatus shown in FIG. 1.
Figure 3:
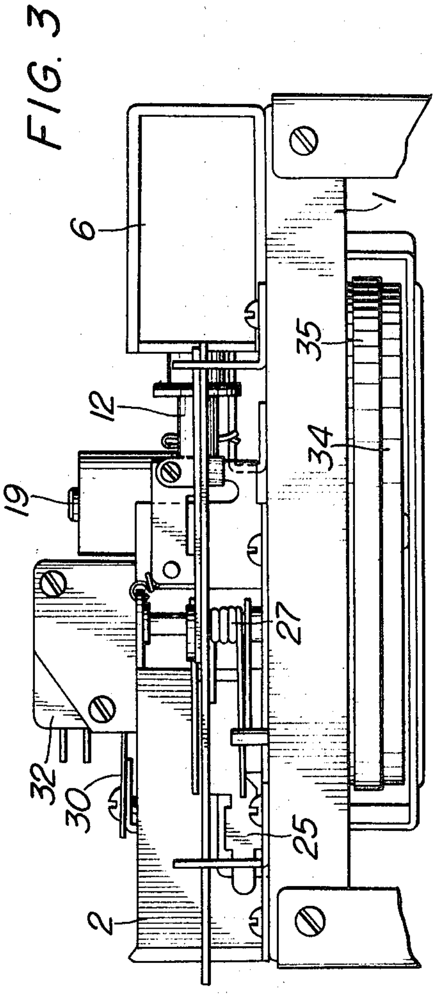
FIG. 3 is a side elevational view of the apparatus shown in FIG. 1.

Referring first to FIGS. 1, 2 and 3, the general structure of the magnetic recording and reproducing apparatus according to the present invention will be described. The magnetic recording and reproducing apparatus includes a base plate 1 on which a cartridge guide 2 is securely fixed. The cartridge guide 2 is provided at its side with a plurality of guide roller pins 29 on which guide rollers 28 are rotatably mounted. A microswitch 32 for switching on and off the power supply and a holding-down spring 30 having a holding-down roller 31 are mounted on the upper face of the cartridge guide 2. A motor 4 is secured to the base plate 1 by a motor mounting member 5, and has a pulley 11 mounted on the motor shaft extending downwardly through the wall of the base plate 1. A driving belt 35 is passed about the motor pulley 11 and a flywheel 34 having a capstan 19 centrally thereof. A tape limiter 9 is provided to limit the vertical movement of a magnetic tape 37, and a contact arm 8 is provided to sense a foil of conductive material bonded to the magnetic tape 37. A transducing head 10 is fixedly mounted on a head arm 21 which is provided with a height adjusting screw 20 engaging a discal track change-over cam 7 having a plurality of track change-over lands of different heights. The head arm 21 is mounted for free azimuth adjustment and vertical swinging movement on the base plate 1 by means of an arm mounting member 23 and an arm support 22.

A cartridge 3 having therein an endless magnetic tape 37 wound in a multiplicity of superposed layers about an axis is inserted in the cartridge guide 2 through the front opening of the latter and is secured in place by a locking roller 24 mounted on a locking arm 25 which can produce a pivotal movement about a pivot pin 26. The locking arm 25 is normally urged to its cartridge locking position by a locking spring 27. A solenoid 6 which is energized in response to electrical contact between the contact arm 8 and the conductive foil on the magnetic tape 37 has its plunger 12 extending forwardly for being operatively connected with a plunger lever 13 which makes a pivotal movement about a pivot pin 14. A shift lever 15 having a compression spring 16 mounted on one end thereof is operatively connected at the other end thereof with the plunger lever 13 by a pin 18.

Figure 5:
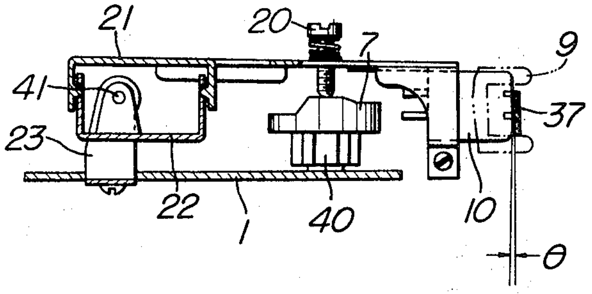
FIG. 5 is a side elevational view of part of FIG. 1 to show the state of the head arm mounting.
Figures 7, 8:
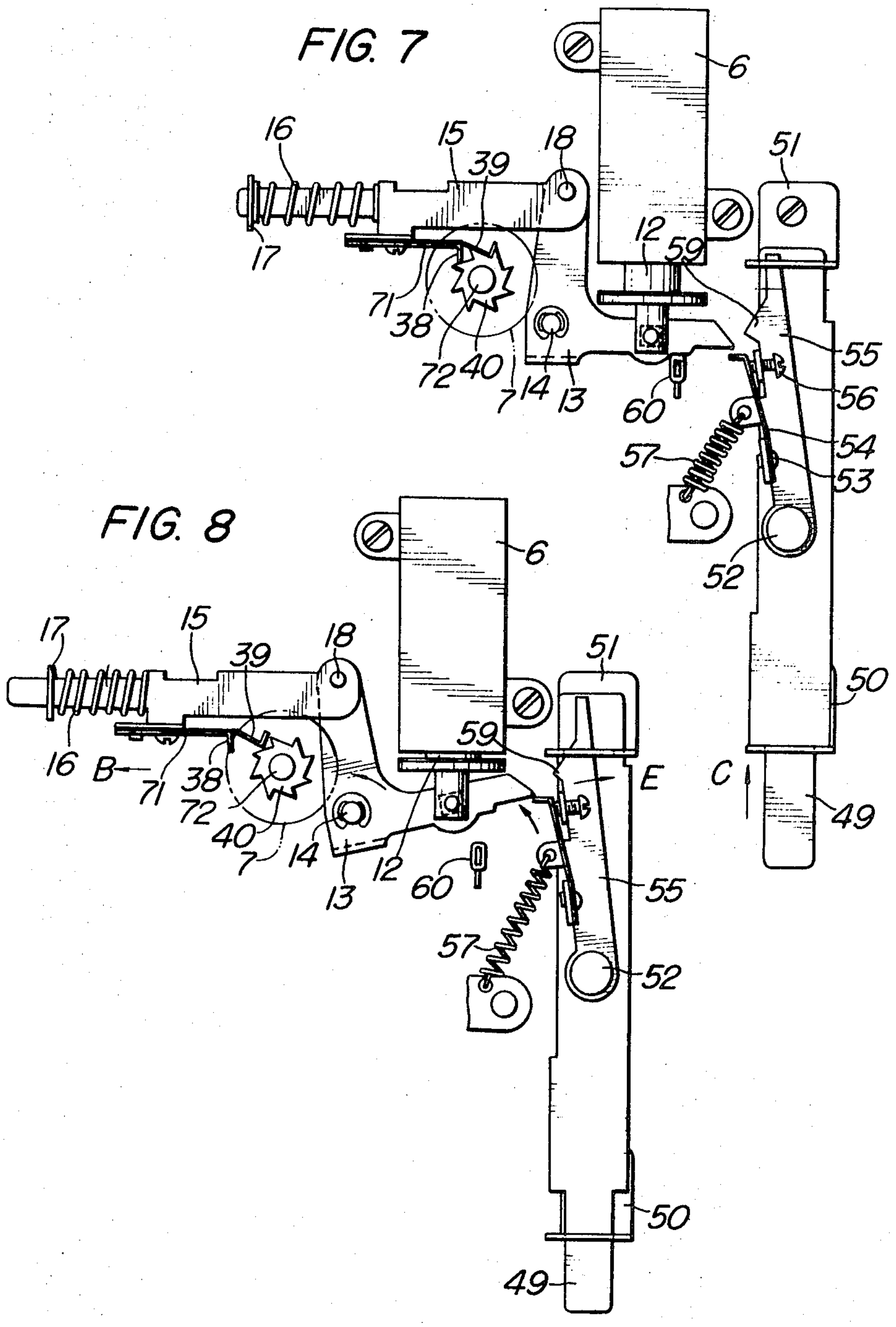
FIG. 7 is a plan view of a manual track change-over mechanism in the apparatus of the present invention with the mechanism shown in its nonactuated position.
FIG. 8 is a view similar to FIG. 7 but showing the mechanism in its partly actuated position.
Figure 9:
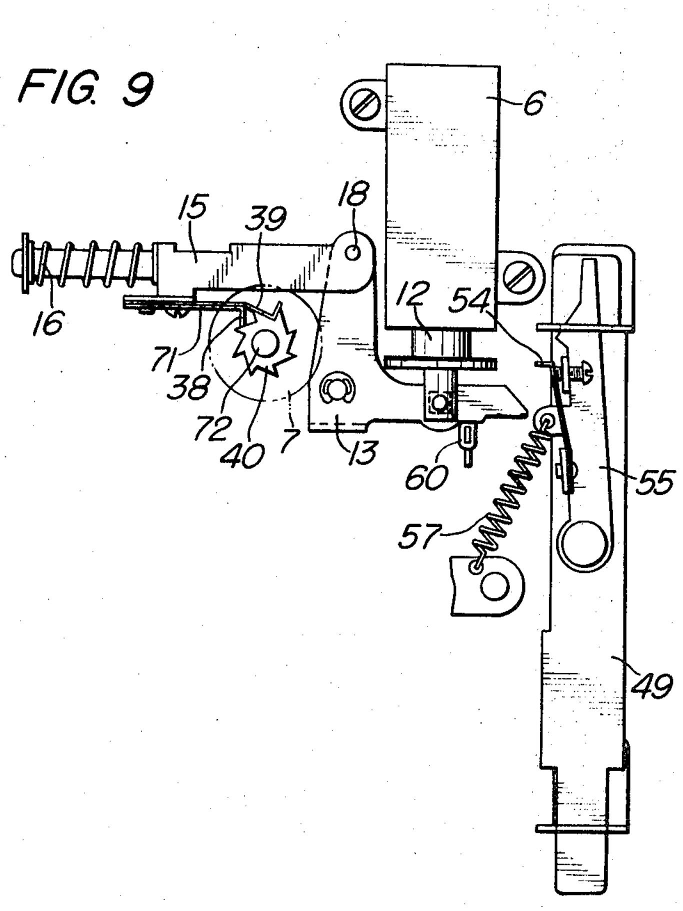
FIG. 9 is a view similar to FIG. 8 but showing the mechanism further advanced to its completely actuated position.

With the above arrangement, when the cartridge 3 is inserted into the cartridge guide 2 as shown in FIG. 1, the cartridge 3 is locked in the predetermined position by the locking roller 24, and the holding-down roller 31 is urged upwardly as shown in FIG. 2, with the result that a movable lug 33 of the microswitch 32 is depressed inwardly to turn on the power supply and thereby starts the motor 4. The magnetic tape 37 enclosed in the cartridge 3 is pressed against the rotating capstan 19 by a pinch roller 36 so that the tape 37 is driven in a direction as shown by an arrow A in FIG. 1. When finally the conductive foil bonded to the magnetic tape 37 moves to make contact with the contact arm 8, the circuit including the solenoid 6 is shorted to cause attraction of the plunger 12. As the plunger 12 is attracted, the plunger lever 13 makes its pivotal movement about the pivot pin 14 from the position shown in FIG. 7 to a position shown in FIG. 8, with the result that the shift lever 15 whose movement is guided by a guide member 17 and which is operatively connected with the plunger lever 13 is urged in a direction, as shown by an arrow B in FIG. 8, against the force of the compression spring 16. In the course of the movement of the shift lever 15 in the direction B, a leaf spring 71 having a stopper finger 38 and a change-over finger 39 and securely fixed to the shift lever 15 moves in a manner, as shown in FIG. 8, away from its former engaging position with a ratchet 40 which is constructed integrally with or unitarily fixed to the cam 7 which is rotatably mounted on the base plate 1 by a shaft 72 and has a plurality of track change-over lands or cam faces of different heights as is best shown in FIG. 5. Since the solenoid 6 is turned off or deenergized when the conductive foil on the magnetic tape 37 has moved past the contact arm 8, the plunger 12, plunger lever 13 and shift lever 15 are restored to their original position as shown in FIG. 7. In the return movement of the shift lever 15, the change-over finger 39 of the leaf spring 71 causes the ratchet 40 to rotate clockwise through an arc corresponding to one tooth of the latter. Since the shift lever 15 is instantaneously urged back to its original position by the compression spring 16, the ratchet 40 may overrun beyond its predetermined angular position. In order to avoid such an overrun of the ratchet 40 for thereby ensuring stoppage of the same at its predetermined angular position, the stopper finger 38 of the leaf spring 71 is so disposed as to engage at its end edge with the back face of the second tooth counted from the tooth engaged by the change-over finger 39 of the leaf spring 71. Therefore, the ratchet 40, hence the cam 7 in FIG. 5 is accurately rotated through a predetermined arc so that the height adjusting screw 20 having been engaged with one of the lands or cam faces is now brought into engagement with the adjacent land or cam face of a height different from the former. The head arm 21 thereby makes a vertical swinging movement in either direction together with the arm support 22 about opposite lugs 41 projecting inwardly from the upstanding walls of the arm mounting member 23 so that a change-over of the recording tracks on the magnetic tape 37 is effected by the vertical swinging movement of the transducing head 10 in the direction of width of the tape 37 running past the head 10 while being limited by the tape limiter 9.

Figure 4:
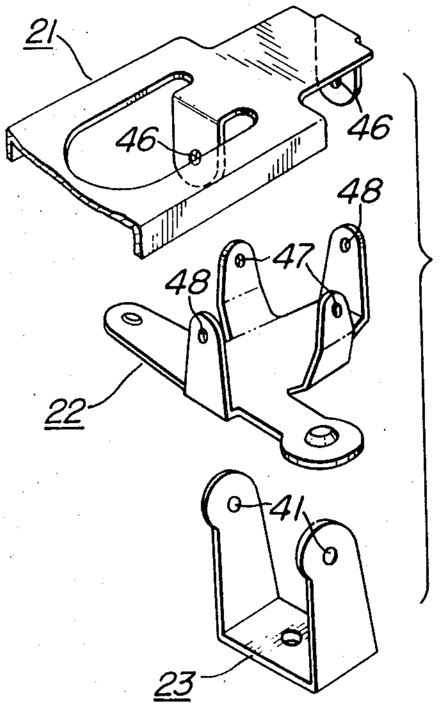
FIG. 4 is an exploded perspective view of a head arm support structure in the apparatus of the present invention.
Figure 6:
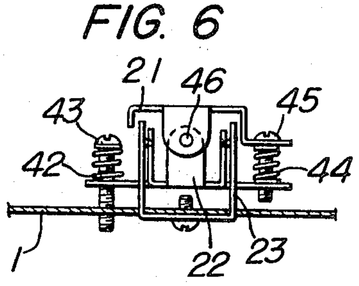
FIG. 6 is a back view of the head arm support structure shown in FIG. 5.

The structure of the head arm section mounting the transducing head 10 thereon will be described in more detail. Referring to FIGS. 4, 5 and 6, the arm support 22 is mounted on the arm mounting member 23 of resilient material such as a leaf spring securely fixed to the base plate 1 in such a way that the arm support 22 can make a pivotal movement about the opposite lugs 41 protruding inwardly adjacent to the ends of the upstanding walls of the arm mounting member 23, while the head arm 21 is mounted on the arm support 22 in such a way that the head arm 21 can make a pivotal movement about the opposite lugs 46 protruding inwardly adjacent to the ends of its depending walls. An azimuth adjusting screw 45 is provided between one end of the arm support 22 and the head arm 21 so that the azimuth adjustment of the transducing head 10 relative to the magnetic tape 37 can be easily effected by the adjustment of the position of the screw 45. A downwardly directed pressure is imparted to the other end of the arm support 22 by means of a compression spring 42 coiled about a screw 43 so that the lower end of the height adjusting screw 20 is always brought into intimate contact with the stepped cam surface of the cam 7. The shape of the arm support 22 and the arm mounting member 23 is best shown in FIG. 4. The arm support 22 is formed from a resilient material such as a leaf spring and has two pairs of upwardly bent portions. Holes 48 provided adjacent to the ends of one pair of upwardly bent portions snugly receive therein the opposite lugs 46 of the head arm 21 which are conical in shape, while holes 47 provided adjacent to the ends of the other pair of upwardly bent portions snugly receive therein the opposite lugs 41 of the arm mounting member 23 which are also conical in shape. By virtue of the above manner of support, the head arm 21 can be supported in an entirely play-free relation in its longitudinal as well as lateral direction. Any play in the head arm support structure can not utterly take place even with gradual wear of the holes 47, 48 and the lugs 41, 46 after long-time use because the upwardly bent portions of the arm support 22 are always outwardly biased by the resiliency of the material forming the arm support 22. Referring further to FIG. 5, the magnetic tape 37 runs in a state in which it is perpendicular with respect to the plane of the base plate 1. Therefore, the head mounting position may be such that the position of the arm support points 41 is set at a suitable height above the base plate 1 or a portion of the head arm 21 is suitably bent so that the transducing head 10 is always inclined in either upward or downward direction at a certain predetermined angle $\theta$ or more and is brought into abutment with the magnetic tape 37 in such an inclined position regardless of whichever tracks on the magnetic tape 37 on which the transducing head 10 is making its transducing operation. By arranging in the manner as described above, the possibility of crosstalk can be eliminated and level fluctuation can be greatly reduced since the magnetic tape 37 can continuously run while being always urged against the upper or lower edge of the tape limiter 9 by its tension at whichever position of the transducing head 10 on the tracks of the tape 37 and thus the magnetic tape 37 can not make a vertical movement within the tape limiter 9.

The magnetic recording and reproducing apparatus according to the present invention is provided with a manual change-over mechanism for the manual change over of the tracks to be converted by the transducing head 10. Referring to FIG. 7, a change-over lever 49 is slidably supported by support members 50 and 51 fixed to the base plate 1 and has a rocking lever 55 pivotally mounted thereon by a pivot pin 52. An abutting member 54 having a bent end is fixed at the other end thereof to the rocking lever 55 by a rivet 53. The position of the bent end portion of the abutting member 54 is adjustable by a screw 56, and the change-over lever 49 and the rocking lever 55 are normally urged in one direction or to its retracted position by a return spring 57.

The manual change-over mechanism operates in a manner as described below. As the change-over lever 49 is gradually urged in a direction as shown by an arrow C, the bent end of the abutting member 54 engages and urges the free end of the plunger lever 13 with the result that the plunger lever 13 makes a pivotal movement as shown in FIG. 8 and the change-over finger 39 of the leaf spring 71 secured to the shift lever 15 moves away from the engaging tooth of the ratchet 40. When the change-over lever 49 is further urged in the direction C from the above state, a sloped portion 59 of the rocking lever 55 in FIG. 8 is forced in the direction as shown by an arrow E. By the movement of the rocking lever 55 in the direction E, the bent end of the abutting member 54 is disengaged from its former engagement with the plunger lever 13, which is therefore rotated clockwise by the force of the compression spring 16 to return to its original position engaged by a stopper 60. During the return movement of the plunger lever 13, a tooth adjacent to the preceding tooth of the ratchet 40 is now engaged by the change-over finger 39 of the leaf spring 71 and is brought to a position which is formerly occupied by the preceding tooth. Thus, the preceding cam face of the cam 7 is now replaced by the succeeding cam face of different height to effect change over of the tracks to be engaged by the transducing head 10 mounted on the head arm 21. When the force imparted to the change-over lever 49 is released under the above state, the return spring 57 forces the change-over lever 49 and the rocking lever 55 back to their original positions shown in FIG. 7.

It will thus be understood that the manual change over of the tracks can be purely mechanically effected without any need for the change-over operation by the plunger 12 of the solenoid 6 and is economical because of reduced current consumption. The manual change-over mechanism according to the invention is advantageous in that the prior trouble of plunger burn can never take place even if the track change-over lever 49 is left in its advanced position, and the compression spring 16 of weak resiliency suffices and a relatively light load is encountered in the manipulation of the change-over lever 49 since the rotation of the cam 7 is effected by instantaneous release of the accumulated energy of the spring. The above mechanism is further advantageous in that the angular position of the rotary cam 7 can always be stably maintained since the cam drive by the force of the spring ensures the drive of the cam by the force which is always stable.

From the foregoing description, it will be appreciated that the present invention effectively prevents the possibility of crosstalk and occurence of level fluctuation which are the greatest problem in the presently developed magnetic recording and reproducing apparatus of the movable head type. Further, the present invention provides simple, compact, inexpensive and highly reliable means which solves all the problems encountered with a set which is primarily designed for mounting on vehicles or for use with batteries including the problem of current consumption and the problem of burn of the plunger, and thus provides a materialized means for the promotion of the practical use of the magnetic recording and reproducing apparatus of the movable head type.

The present invention having immeasurably great industrial values as described above is in no way limited to the specific embodiment described herein, and many changes and modifications may be made without departing from the spirit of the invention.

I claim:

1. A magnetic recording and reproducing apparatus of the type adapted for use with a multitrack tape cartridge comprising a recording and reproducing movable magnetic head, a head arm structure to one end of which said magnetic head is fixed, a head arm support structure, a discal cam provided with a plurality of cam faces of different heights operatively associated with said head arm structure, and a mechanism for causing rotation of a predetermined angle of said discal cam to move said magnetic head in a direction perpendicular to the traveling direction of a multitrack magnetic tape to effect a change over of tracks, said head arm structure being provided with means for mounting said magnetic head so as to make the tape abutting face of said magnetic head to be inclined from a free traveling plane of said magnetic tape in which said magnetic tape tends to travel without said magnetic head associated therewith, said inclination being such that an intersection line of said tape abutting face and said free traveling plane of said magnetic tape is substantially in the traveling direction of said magnetic tape and is always in one of the two halves of said magnetic head irrespective of the position of said magnetic head on said multitrack tape, in which said head arm structure is provided with bent portions at its other end which have a pair of conical lugs projecting from said bent portions, and said head arm support structure comprises in an elastic combination an arm support of a resilient material having a first pair of upstanding portions and a second pair of upstanding portions, said first pair of upstanding portions having holes to receive therein said pair of conical lugs of said head arm structure and serve as bearing means for the azimuth adjustment of said head arm structure, and an arm mounting member of a resilient material having a pair of upstanding portions provided with a pair of conical lugs projecting therefrom, said second pair of upstanding portions having holes to receive therein the conical lugs of said arm mounting member and serve as bearing means for the vertical swinging movement of said head arm structure.

2. A magnetic recording and reproducing apparatus as claimed in claim 1, in which the positioning of the pair of conical lugs on said upstanding portions of said arm mounting member is such that provides the said inclination of said recording and reproducing magnetic head with respect to the magnetic tape.